Nov. 30, 1937.   B. B. BACHMAN   2,100,371
MOTOR VEHICLE CONSTRUCTION
Original Filed June 16, 1934
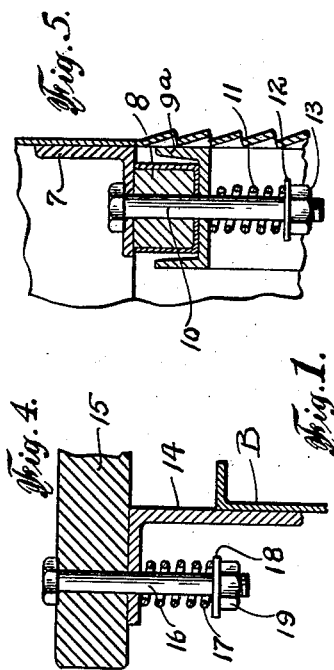
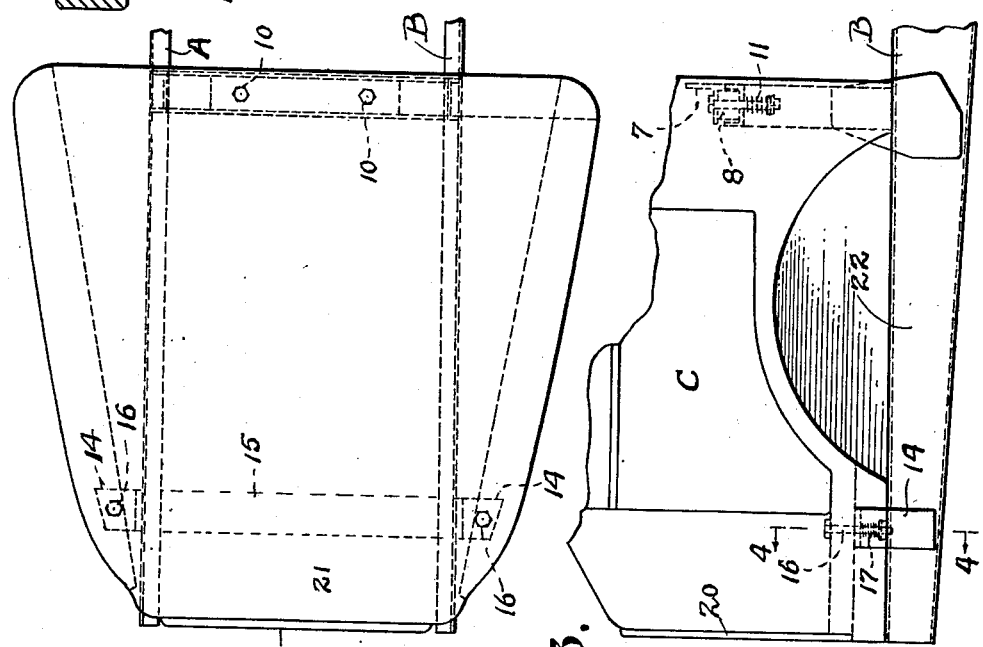

Patented Nov. 30, 1937

2,100,371

UNITED STATES PATENT OFFICE 2,100,371

MOTOR VEHICLE CONSTRUCTION

Benjamin B. Bachman, Philadelphia, Pa., assignor to The Autocar Company, Ardmore, Pa., a corporation of Pennsylvania Original application June 16, 1934, Serial No. 730,863. Divided and this application March 29, 1935, Serial No. 13,605

6 Claims. (Cl. 296—35)

This invention relates generally to vehicles and vehicle constructions and is more particularly directed to improvements in motor-vehicles, as trucks and similar commercial carriers, of those types, wherein the operator or driver is housed within a so-called cab or enclosure, for protection against the weather.

While my invention, as will become manifest from the following description, possesses a wide range of application in the automotive and other arts, for the purposes of this disclosure, I have elected to present it, as it may be practiced in the construction and operation of trucks and similar road vehicles of those types wherein the engine is within the area of the cab, such for instance, as described in my co-pending application for Letters Patent for Motor vehicles, Serial No. 730,863, filed June 16, 1934, in which the subject-matter hereof is disclosed and of which this application is a division. However, it will be understood that this is merely illustrative and that my invention may be practiced in mounting other types of cabs upon the chassis frame, or in mounting vehicle bodies or cabins or passenger compartments, as in marine and aircraft, without departing from the spirit and scope of this invention.

As is well known, in the conventional truck designs, it has been the standard practice to mount the cab upon the frame of the chassis, independently of the platform or body, the cab, in fact, forming a unit of the chassis assembly to which a body of the required open or closed type is subsequently applied. The cab, customarily, is bolted, or otherwise rigidly connected to the longitudinals or to cooperating transverse members of the frame, so that it virtually becomes an integral part thereof. Thus, the detrimental forces, as the variable twisting or torsional strains, to which the frame is subjected, in the operation of the vehicle, are communicated directly to the cab, with resulting discomfort to its occupants and rapid deterioration of the cab structure, which, in the case of a closed cab, becomes quickly evident in the jamming of the doors and windows.

It has been proposed to overcome the disadvantages residing in the rigid interconnection of the frame and cab structure, by interposing yieldable devices, as rubber pads or cushions, between the cab and frame members. In other instances the cab unit has been hinged or rockably connected to the frame for relative movement on an axis parallel to the transverse axis of the vehicle frame. None of these attempts, however, to obviate the recognized shortcomings of the rigid connection of the cab to the frame has been entirely successful. For example, the rubber devices, while inherently resilient, are under an initial compression load which renders them of negligible value beyond dampening out some of the minor vibrations that are transmitted to the cab structure. On the other hand, in the rockable or hinged connection of the cab to the frame, the relative movement of the cab and frame is limited both in range and directionally, so that no appreciable benefits are derived from the employment of mountings of this type.

Therefore, it is the primary object of this invention to provide a practical and efficient method and means for mounting a body or cab upon the chassis or other supporting frame of a vehicle, whereby the communication of detrimental forces to the supported structure from the frame will be eliminated, or minimized to a negligible degree.

A further object of my invention is to promote the comfort of those riding in the passenger or operating compartments of vehicles of various types by providing for the dissipation or absorption between such compartments and their supporting media, as vehicle frame members, of detrimental vibrations set up in the operation of the vehicle.

Another object of my invention is to provide a simple and effective means for mounting vehicle bodies, operators' cabs and their equivalents, upon their supporting frames which will function to absorb or dissipate such shocks as may be communicated thereto through the frame in a controlled cushioning action.

More specifically, the object of this invention is to provide a mounting for cabs in motor-vehicles wherein the cab is located between the ends of the chassis frame, or elsewhere upon the frame, whereby the cab will be yieldably supported at a plurality of fore and aft points, to admit of relative movement of the cab and the supporting frame in a multiplicity of directions.

A further object of my invention is to provide for relative substantially universal movement between a vehicle frame and an operators' cab in superposed relation thereto, under the control of yieldable devices, functioning to nullify the effect of detrimental forces to which the frame is subjected in the operation of the vehicle.

My invention also contemplates a vehicle construction embodying a cab and supporting frame, with means interconnecting the cab and frame, whereby shocks that may be transmitted to the cab will be dissipated within the structure itself, thus promoting the comfort of the occupants or the operating crew of the vehicle.

Other objects and advantages flowing from the practicing of my invention doubtless will become apparent as the description proceeds and I would have it clearly understood that I reserve unto myself all rights to the full range of equivalents, both in structure and in use, to which I may be entitled under my invention in its broadest aspect.

In the accompanying drawing, I have illustrated a preferred embodiment of my invention, such as may be employed in the construction of a vehicle in which the engine is located within the cab, as shown in my aforesaid co-pending application. However, as before pointed out, it will be obvious that the use of this construction is not limited to this particular design of vehicle. Also, the invention may take other forms to meet requirements of production and use, within the purview of the appended claims.

In the drawing:

Figure 1 is a rear elevation of a cab conforming to my invention, showing the suspension means which I utilize in mounting it on the supporting frame member.

Figure 2 is a top plan view of the structure of the preceding figure.

Figure 3 is a side elevation of a fragment of the cab structure, illustrative of the relative disposition of the fore and aft mountings, and Figures 4 and 5 are respectively enlarged sectional details of the cab suspension means.

Referring now to the drawing in detail, in which similar characters of reference are employed to designate like parts in the several views, the cab generally indicated by the reference letter C, embodies in its structure the rear transverse frame member 7, which abuts upon a bolster 8, preferably of wood, located in the horizontal portion 9a of the inverted U-shaped saddle-forming channel member 9, disposed in a vertical plane and fixed to the longitudinal members A—B of the chassis frame, as at 9b, the superimposed parts 7, 8 and 9a, being apertured for the reception of the bolts 10, carrying springs 11 interposed between the web of the saddle portion 9a and the washers 12 and their cooperating securing nuts 13. Obviously, the saddle-forming member may take other forms, as may the bolster, 8, the former providing a seat or supporting surface for the latter which normally abuts thereupon, under the initial compression control of the springs 11.

The forward end of the cab, likewise, is yieldably suspended from the aforesaid frame members A—B, suitable angle pieces 14, forming brackets, being secured thereto, as by riveting or welding, to function as seats upon which the front transverse frame member 15 embodied in the base of the cab frame rests, this latter member and the respective brackets having alined openings to receive the bolts 16 supporting the springs 17, interposed between the web of the brackets and the washers 18, with which the nuts cooperate to retain the springs in compression, similarly to the nuts on the bolts 10. In lieu of the angle pieces 14, other bracket members may be utilized, or equivalents may be produced integral with the chassis frame members, these cab supporting surfaces being positioned adjacent the forward end of the frame and in the plane of the top thereof, or slightly thereabove, for the objects that, hereinafter, will become apparent.

As will be observed, the suspension points of the forward end of the cab are approximately at the sill line thereof and outwardly of, or beyond, the vertical part or web portion of the frame members A—B, while those of the rear end are inwardly of the frame longitudinals A—B and an appreciable distance thereabove, as may be fixed by the height of the aforesaid saddle 9, the contour of which, as will be evident, will permit the cab to rock laterally under the control of the fore and aft cushioning devices or springs 11 and 17. Thus, the four-point suspension not only possesses all of the advantages that would flow from a three-point suspension, but affords a more substantial and practical mounting, and one that effectively eliminates the excessive, and sometimes dangerous, rocking that is inherent to the three-point suspension mounting designs. Further, the placement of the rear connecting devices, inwardly of the forward connections and providing for the normal disposition of the cab directly upon its supporting members, as the lateral extensions and saddle, relieves the cab structure of strains that would be set up therein, were a three-point suspension employed, or were the cab load less equally distributed.

From the foregoing, it will be apparent that the four-point suspension that I have devised, has all of those characteristics which are essential to the attainment of the objectives hereinbefore set forth. The cab and frame members are capable of relative movement in a multiplicity of directions for the dissipation or absorption of detrimental forces, it being manifest that each of the four springs may contract or expand or oscillate independently of the others; also that they may be designed to meet any load requirements or other conditions to which they must respond in use, so that the application of my invention in various fields may be accomplished by the employment of standard materials. Further, while the cab mounting is adapted to instantly respond or react to forces transmitted to it, in the operation of the vehicle in which it is incorporated, it, at the same time, possesses sufficient steadiness to promote a sense of stability and security that is not afforded to the occupants of a cab suspended by previously proposed forms of yieldable devices.

The cab herein shown, obviously, differs from one of the conventional design, because of the fact that in the type of vehicle to which it is applicable, as shown in my aforesaid co-pending application, the radiator is positioned close to the dashboard 20 and within the cowl 21. The cab is symmetrically proportioned and affords more than the usual space for the accommodation of the vehicle crew members, the arrangement of the uprights and cross-pieces contributing to the attainment of an extremely rigid and durable construction. The sides, as will be noted, are recessed or provided with wheels wells 22, for the close-coupled type of vehicle referred to, but, of course, these will not be necessary in the standard designs.

I claim:

1. The combination with a frame, as that of a vehicle chassis, of a body and means for connecting said body to said frame for controlled relative movement, said means including a rigid supporting member spanning said frame in vertically spaced relation thereto, lateral extensions rigid with said frame forwardly of said supporting member, devices connecting the forward part of the body in proximity to its base line in bearing engagement with said lateral extensions and devices located on either side of the median line of said body, for connecting the rear part of said body in bearing engagement with said member in a zone an appreciable distance above the base line of said body, all of said devices including resilient elements functioning to yieldably control the relative movements of the parts interconnected by said devices, and permit said body to rock laterally upon said member.

2. In a motor-vehicle, a frame including longitudinal channel members, a lateral extension rigid with such of said members adjacent its forward end, embodying a horizontal bolster-receiving seat having curved end portions merging into vertical sections fixed to said longitudinals at their lower ends, said seat spanning said longitudinals in vertically spaced relation thereto, a body, means for connecting said body at its forward end in proximity to its base line, to said lateral extensions, a rigid bolster located transversely of the rear of said body in vertically spaced relation to the base line thereof, adapted for disposition in the aforesaid bolster-receiving seat and means for connecting said bolster in bearing engagement with said seat, all of said connecting means including rigid devices and yieldable elements associated therewith to cooperate with said lateral extensions and said member to permit relative movement of the body and the supporting frame components upon which it normally bears, the body being rockable upon said bolster-receiving member.

3. In a motor-vehicle, a cab structure embodying a member disposed transversely thereof at its rear end in vertically spaced relation to the base line defined by the cab sides, said member including a dependent portion, and means for mounting said cab upon the vehicle frame for relative movement, said means including extensions projecting laterally of and rigid with said frame, adjacent its forward end, resilient devices for connecting the forward part of said cab structure in bearing engagement with said extensions, a member bridging said frame rearwardly of said lateral extensions and extending upwardly therefrom an appreciable distance, said member embodying a seat for the dependent portion of said transverse cab member and devices including resilient elements for connecting said dependent portion of the cab structure to said bridging member when seated therein, the resilient elements of all of said connecting devices being normally under compression to retain the forward and rear bearing surfaces of said cab structure in engagement with their respective rigid supporting surfaces, said devices functioning to permit said cab to rock laterally upon its supports under the control of said elements.

4. The combination with a vehicle frame of a cab and means for mounting said cab for movement relatively to said frame, said means including a horizontally disposed surface rigid with and projecting outwardly from each longitudinal frame member, adjacent its forward end, a U-shaped member inverted and fixed to said longitudinals to the rear of said surfaces, the base of the U embodying a bolster-receiving seat and spanning the frame in vertically spaced relation thereto, means in juxtaposition to the base of said cab adapted to bear upon said horizontal surfaces, a bolster disposed transversely of and rigid with the rear end of said cab, said bolster being vertically spaced from the base-line of the cab and locatable within said seat, in bearing engagement therewith, and devices including resilient elements for connecting said cab to said horizontal surfaces and to said U-shaped member for relative movement, the stations of the connecting devices at the rear of the cab being on either side of the median line of said cab and in proximity thereto, whereby said cab will be capable of rocking upon said U-shaped member under the control of said elements.

5. In a motor-vehicle, a cab and means for supporting said cab from the frame of the vehicle chassis for universal relative movement, said means including rigid bearing surfaces for the forward end of said cab carried by said frame, resilient means normally functioning to maintain said cab in bearing engagement with said rigid bearing surfaces, a rigid inverted U-shaped member transversely spanning said frame to present a rigid support for the rear-end of said cab in a zone an appreciable distance above the horizontal plane of the chassis frame and resilient means normally functioning to maintain the rear-end of said cab in bearing engagement with the supporting surface of said U-shaped member, said cab being capable of rocking movement on its bearing surfaces, under the control of said resilient means, in response to activating forces transmitted thereto and to said frame.

6. In a motor-vehicle, a cab and means for supporting said cab from the chassis of the vehicle for relative universal movement, said means including an inverted U-shaped member transversely spanning the chassis frame and rigid therewith, the horizontal portion of said member being located in a zone vertically spaced from the horizontal plane of the vehicle frame and forming a bearing surface for the rear-end of the cab, resilient means connecting the rear-end of said cab to the bearing portion of said U-shaped member normally functioning to maintain the cab in bearing position thereon and means for resiliently connecting the forward end of the cab to the chassis frame, all of said resilient connections being capable of yielding under distorting forces to permit said cab to rock in bearing engagement with said U-shaped member.

BENJAMIN B. BACHMAN.